United States Patent
Hayashidera

(10) Patent No.: US 11,526,378 B2
(45) Date of Patent: Dec. 13, 2022

(54) INFORMATION PROCESSING DEVICE AND INFORMATION PROCESSING METHOD

(71) Applicant: TOYOTA JIDOSHA KABUSHIKI KAISHA, Toyota (JP)

(72) Inventor: Akira Hayashidera, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 362 days.

(21) Appl. No.: 16/691,702

(22) Filed: Nov. 22, 2019

(65) Prior Publication Data

US 2020/0225985 A1 Jul. 16, 2020

(30) Foreign Application Priority Data

Jan. 16, 2019 (JP) .............................. JP2019-005333

(51) Int. Cl.
G06F 9/46 (2006.01)
G06F 9/48 (2006.01)
G06F 1/20 (2006.01)
G06F 1/329 (2019.01)
G06T 1/20 (2006.01)
G06F 1/3206 (2019.01)
G06F 9/50 (2006.01)

(52) U.S. Cl.
CPC ............ G06F 9/4881 (2013.01); G06F 1/206 (2013.01); G06F 1/3206 (2013.01); G06F 1/329 (2013.01); G06F 9/5094 (2013.01); G06T 1/20 (2013.01)

(58) Field of Classification Search
CPC ...... G06F 9/4881; G06F 1/206; G06F 1/3206; G06F 1/329; G06F 9/5094; G06F 9/4893; G06F 9/48; G06F 9/5038; G06T 1/20; B60W 50/14; B60W 30/18; B60W 30/18009; B60W 30/00
USPC ......................................................... 718/102
See application file for complete search history.

(56) References Cited

U.S. PATENT DOCUMENTS

| | | | |
|---|---|---|---|
| 2005/0120252 A1* | 6/2005 | Uwatoko | G06F 9/30083 712/E9.032 |
| 2005/0246514 A1 | 11/2005 | Nishida | |
| 2006/0070074 A1 | 3/2006 | Maeda et al. | |
| 2006/0095911 A1* | 5/2006 | Uemura | G06F 9/5027 718/100 |
| 2007/0156310 A1* | 7/2007 | Hirano | B60T 8/885 701/31.8 |
| 2008/0091974 A1* | 4/2008 | Nakashima | G06F 9/5044 714/10 |

(Continued)

FOREIGN PATENT DOCUMENTS

| | | | |
|---|---|---|---|
| JP | 2004-126968 A | 4/2004 | |
| JP | 2005-316764 A | 11/2005 | |

(Continued)

*Primary Examiner* — Kenneth Tang
(74) *Attorney, Agent, or Firm* — Oblon, McClelland, Maier & Neustadt, L.L.P.

(57) ABSTRACT

An information processing device that includes: a memory; and a monitoring processor that is coupled to the memory, wherein the monitoring processor is configured to, in accordance with temperature information of a chip on which a plurality of monitored processors are mounted, stop execution of tasks designated as having low degrees of priority that are set in advance, among a plurality of tasks that are respectively executed at any of the plurality of monitored processors.

11 Claims, 8 Drawing Sheets

(56) References Cited

U.S. PATENT DOCUMENTS

| | | | | |
|---|---|---|---|---|
| 2010/0030395 | A1* | 2/2010 | Shimotono | G06F 1/206 |
| | | | | 715/764 |
| 2012/0271481 | A1* | 10/2012 | Anderson | G06F 1/206 |
| | | | | 700/299 |
| 2017/0371719 | A1* | 12/2017 | Majumdar | G06F 9/5094 |
| 2018/0335775 | A1* | 11/2018 | Konishi | G05D 1/0061 |
| 2019/0212749 | A1* | 7/2019 | Chen | B62D 15/0255 |
| 2019/0248208 | A1* | 8/2019 | Higashitani | E05F 15/71 |
| 2019/0258251 | A1* | 8/2019 | Ditty | G06V 20/58 |
| 2021/0165418 | A1* | 6/2021 | Grabner | G06T 7/246 |
| 2022/0066530 | A1* | 3/2022 | Nakamura | G06F 1/203 |

FOREIGN PATENT DOCUMENTS

| | | |
|---|---|---|
| JP | 2006-099624 A | 4/2006 |
| JP | 2006-133995 A | 5/2006 |
| JP | 2009-069921 A | 4/2009 |

\* cited by examiner

INFORMATION PROCESSING DEVICE AND INFORMATION PROCESSING METHOD

CROSS-REFERENCE TO RELATED APPLICATION

This application is based on and claims priority under 35 USC 119 from Japanese Patent Application No. 2019-005333 filed on Jan. 16, 2019, the disclosure of which is incorporated by reference herein.

BACKGROUND

Technical Field

The present disclosure relates to an information processing device and an information processing method.

Related Art

Japanese Patent Application Laid-Open (JP-A) No. 2006-099624 discloses a technique of uniformizing the temperatures of processors by detecting the respective temperatures of plural processors by temperature sensors, and assigning the task whose heat generating amount is a maximum value to the processor that is not executing a task and whose temperature is the minimum value.

In the technique disclosed in JP-A No. 2006-099624, there is the concern that, in a case in which the temperatures of all of the processors are high, it will not be possible to assign a processor to a task whose processing load is high, and accompanying this, the functions realized by the plural processors on the whole will stop.

SUMMARY

An aspect is an information processing device that includes: a memory; and a monitoring processor that is coupled to the memory, wherein the monitoring processor is configured to, in accordance with temperature information of a chip on which a plurality of monitored processors are mounted, stop execution of tasks designated as having low degrees of priority that are set in advance, among a plurality of tasks that are respectively executed at any of the plurality of monitored processors.

DETAILED DESCRIPTION

Figure 1:
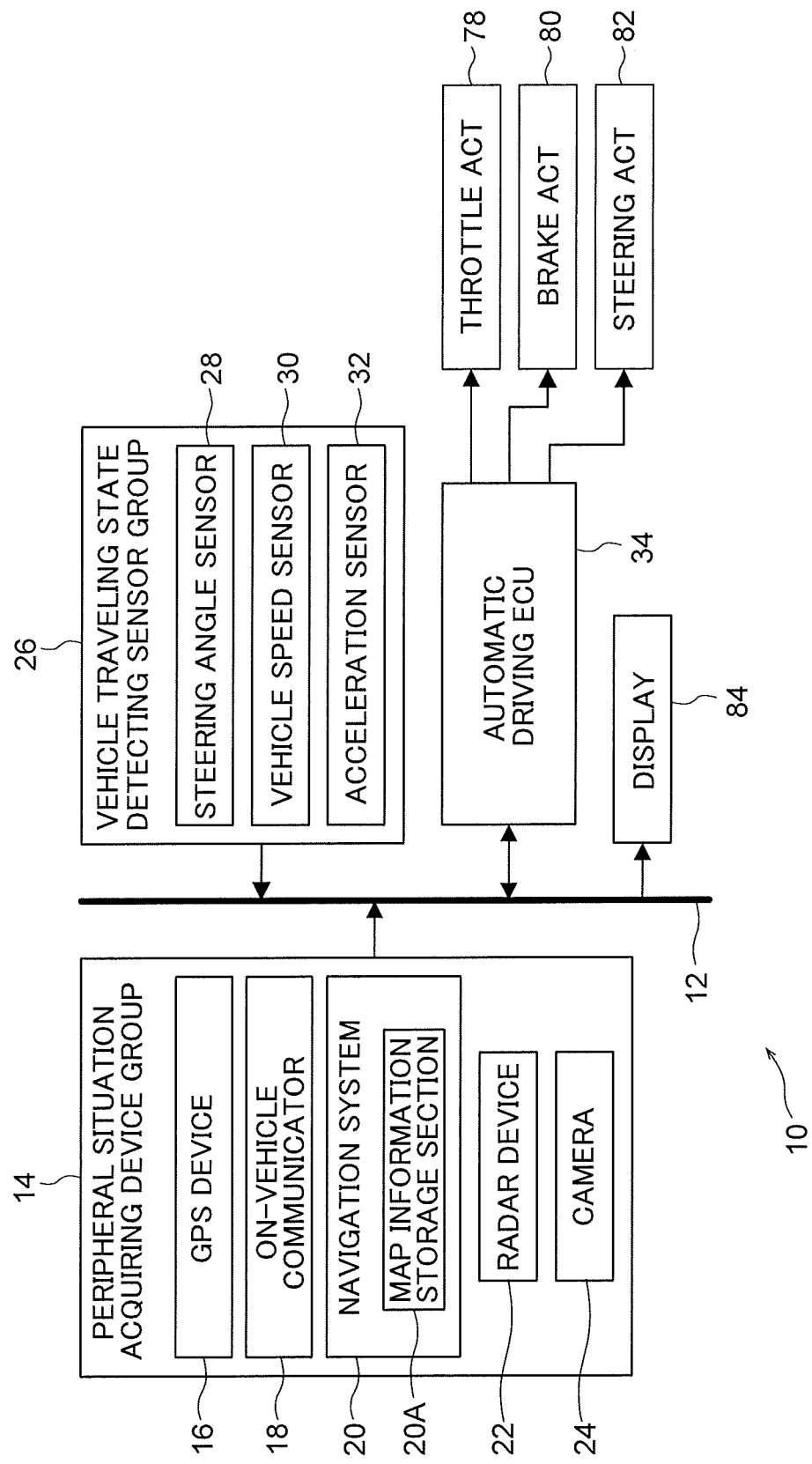
FIG. 1 is a schematic block drawing exemplifying an on-board system relating to an embodiment.

An example of an embodiment of the present invention is described in detail hereinafter with reference to the drawings. An onboard system 10 that is exemplified in FIG. 1 has a bus 12. A peripheral situation acquiring device group 14, a vehicle traveling state detecting sensor group 26, an automatic driving ECU (Electronic Control Unit) 34 and a display 84 are respectively connected to the bus 12. Note that only a portion of the onboard system 10 is shown in FIG. 1. Further, in the following description, the vehicle in which the onboard system 10 is installed is called the own vehicle.

The peripheral situation acquiring device group 14 includes, as devices that acquire information expressing what type of situation the peripheral environment of the own vehicle is in, a GPS (Global Positioning System) device 16, an onboard communicator 18, a navigation system 20, a radar device 22 and a camera 24.

The GPS device 16 receives GPS signals from plural GPS satellites, and measures the position of the own vehicle. The accuracy of measurement improves in accordance with an increase in the number of GPS signals that the GPS device 16 can receive. The onboard communicator 18 is a communication device that carries out at least one of inter-vehicle communications between the own vehicle and other vehicles and road-vehicle communications between the own vehicle and roadside devices. The navigation system 20 is structured to include a map information storage section 20A that stores map information. On the basis of the position information obtained from the GPS device 16 and the map information stored in the map information storage section 20A, the navigation system 20 carries out processing that displays the position of the own vehicle on a map and that guides the own vehicle along the path to the destination.

The radar device 22 includes plural radar devices whose detection ranges differ from one another. The radar device 22 detects, as point information, objects such as pedestrians and other vehicles and the like that exist at the periphery of the own vehicle, and acquires relative positions and relative speeds between the detected objects and the own vehicle. Further, the radar device 22 incorporates therein a processing device that processes the results of detecting objects at the periphery. On the basis of changes in the relative positions and the relative speeds between the own vehicle and individual objects that are included in recent, plural results of detection, and the like, this processing device excludes noise, roadside objects such as guard rails and the like, and the like from objects of monitoring, and tracks and monitors specific objects, such as pedestrians and other vehicles and the like, as object of monitoring. Further, the radar device 22 outputs information of the relative positions and the relative speeds between the own vehicle and the individual objects of monitoring, and the like. The camera 24 captures images of the periphery of the own vehicle by plural cameras, and outputs the captured images.

Further, the vehicle traveling state detecting sensor group 26 includes, as plural sensors that acquire the traveling state of the vehicle, a steering angle sensor 28 that detects the steering angle of the own vehicle, a vehicle speed sensor 30 that detects the traveling speed of the own vehicle, and an acceleration sensor 32 that detects acceleration applied to the own vehicle.

A throttle ACT 78 that changes the degree of opening of the throttle of the own vehicle, and a brake ACT 80 that changes the braking force generated by the braking device of the own vehicle, are connected to the automatic driving ECU 34. Further, a steering ACT 82 that changes the amount of steering by the steering device of the own vehicle is connected to the automatic driving ECU 34.

Figure 2:
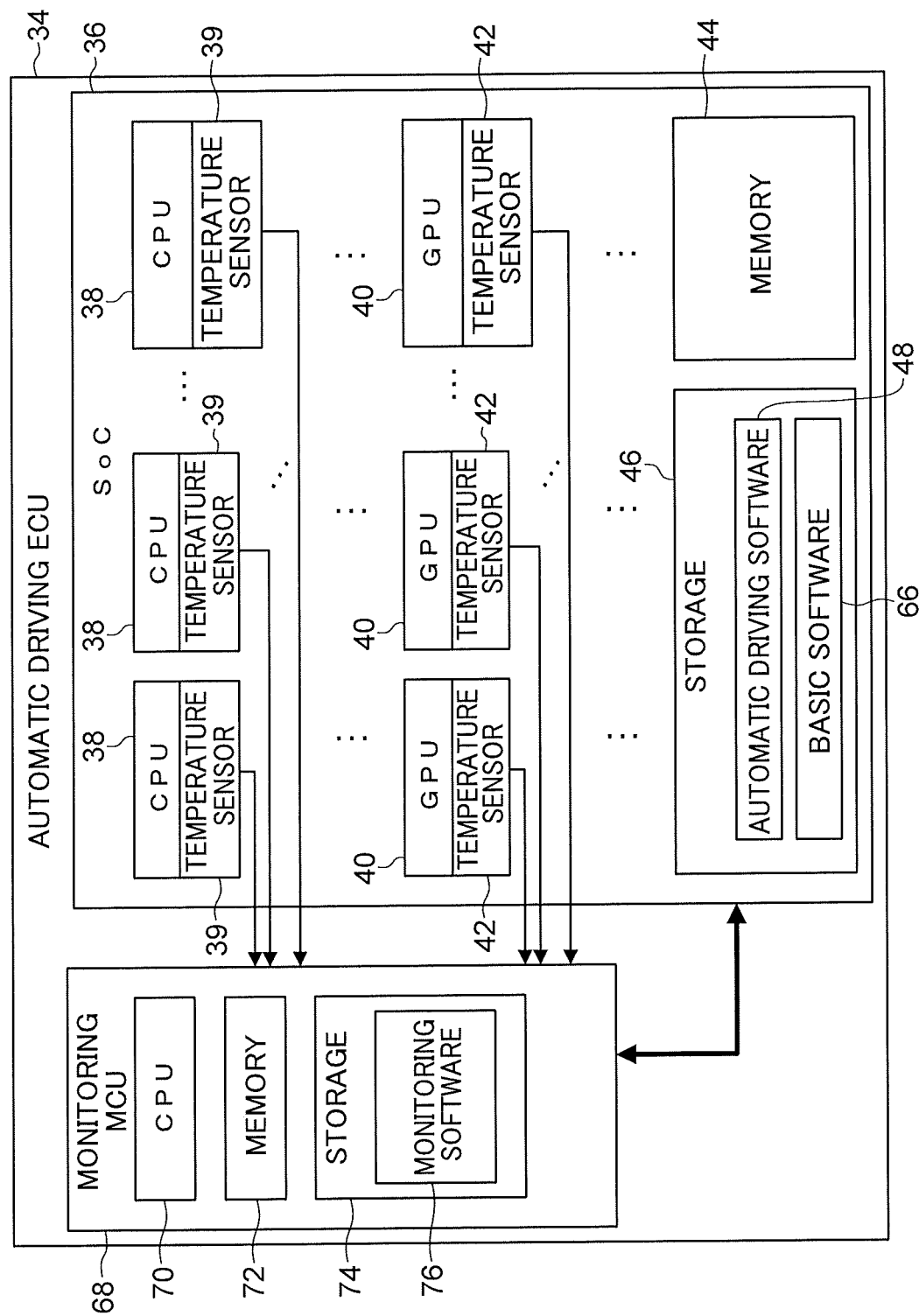
FIG. 2 is a schematic block drawing exemplifying an automatic driving ECU.

As shown in FIG. 2, the automatic driving ECU 34 includes an SoC (System-on-a-Chip) 36 and a monitoring MCU (Micro Controller Unit) 68. The SoC 36 includes plural CPUs 38, plural temperature sensors 39 that detect the temperatures of the individual CPUs 38, plural GPUs 40, plural temperature sensors 42 that detect the temperatures of the individual GPUs 40, a memory 44 and a non-volatile storage 46, and is a chip on which these elements are made into an integrated circuit and are respectively mounted. Note that the SoC 36 is an example of the chip, and the CPUs 38 and the GPUs 40 are examples of the monitored processors.

Figure 3:
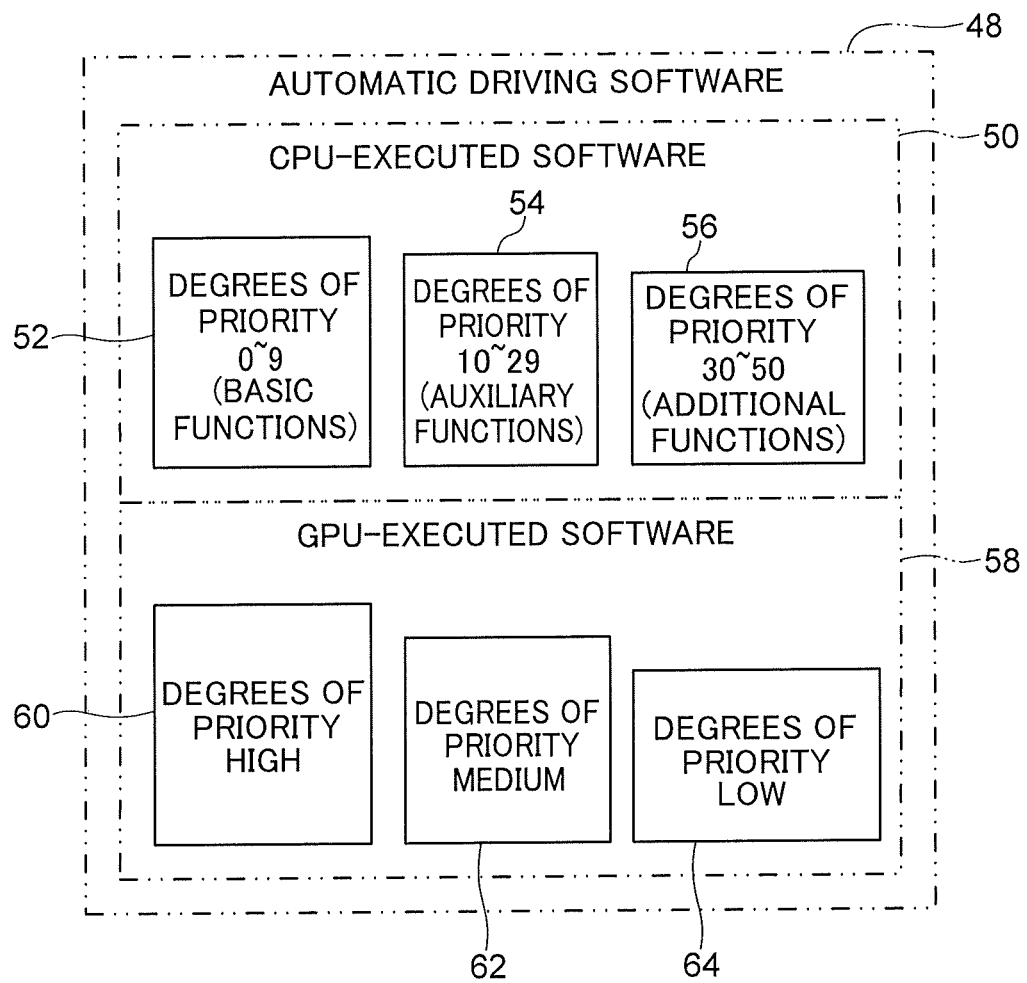
FIG. 3 is a schematic block drawing exemplifying automatic driving software.

Automatic driving software 48 and basic software 66 are stored in the storage 46 of the SoC 36. The automatic driving software 48 is a software group that carries out automatic driving processing that causes the own vehicle to travel automatically, in a case in which an automatic driving mode is selected and regardless of driving operations that are carried out by an occupant of the own vehicle. As shown in FIG. 3, the automatic driving software 48 includes CPU-executed software 50 that the CPUs 38 execute, and GPU-executed software 58 that the GPUs 40 execute.

The CPU-executed software 50 includes software 52 that realize/provide basic functions of the automatic driving processing, software 54 that realize/provide auxiliary functions of the automatic driving processing, and software 56 that realize/provide additional functions of the automatic driving processing.

The basic functions of automatic driving processing are functions that determine the situation of the own vehicle and the periphery thereof on the basis of information acquired from the peripheral situation acquiring device group 14 and the vehicle traveling state detecting sensor group 26, and control the throttle ACT 78, the brake ACT 80, and the steering ACT 82. High degrees of priority (priority degrees 0~9) are set for the software 52 that realize the basic functions of the automatic driving processing.

The auxiliary functions of automatic driving processing are functions that carry out processings such as, for example, carrying out communications with the exterior of the own vehicle, receiving input operations from an occupant of the own vehicle, displaying the state of the automatic driving processing on the display 84, and the like. Medium degrees of priority (priority degrees 10~29) are set for the software 54 that realize the auxiliary functions of the automatic driving processing.

The additional functions of automatic driving processing are functions that carry out processings such as, for example, downloading and updating a new version of the automatic driving software 48 from the exterior, and the like. Low degrees of priority (priority degrees 30~50) are set for the software 56 that realize the additional functions of the automatic driving processing.

The GPU-executed software 58 also include software 60 for which high degrees of priority are set, software 62 for which medium degrees of priority are set, and software 64 for which low degrees of priority are set.

The basic software 66 include scheduler software. The scheduler manages a CPU-executed software list, and dynamically assigns the execution of tasks corresponding to the respective software that are registered in the CPU-executed software list to any of the plural CPUs 38. Note that, in the initial state, all of the software 52, 54, 56 that are included in the CPU-executed software 50 are respectively registered in the CPU-executed software list.

Further, the scheduler also manages a GPU-executed software list, and dynamically assigns the execution of tasks corresponding to the respective software that are registered in the GPU-executed software list to any of the plural GPUs 40. Note that, in the initial state, all of the software 60, 62, 64 that are included in the GPU-executed software 58 are respectively registered in the GPU-executed software list.

The SoC 36 executes software execution control processing that is described later due to the basic software 66 being read-out from the storage 46 and being expanded in the memory 44, and the basic software 66 that is expanded in the memory 44 being executed by any of the CPUs 38 of the SoC 36.

The monitoring MCU 68 includes a CPU 70 which is an example of a monitoring processor, a memory 72 and a non-volatile storage 74. The monitoring MCU 68 is connected by analog signal lines to the individual temperature sensors 39, 52 of the SoC 36, and is connected by a digital communication line (e.g., the Internet®) to the SoC 36. Monitoring software 76 is stored in the storage 74. The monitoring MCU 68 carries out the SoC CPU monitoring processing and the SoC GPU monitoring processing that are described next, due to the monitoring software 76 being read-out from the storage 74 and expanded in the memory 72, and the monitoring software 76 that has been expanded in the memory 72 being executed by the CPU 70.

Note that the automatic driving ECU 34 is an example of the information processing device, and the monitoring ECU 68 is an example of the control section.

Figure 4:
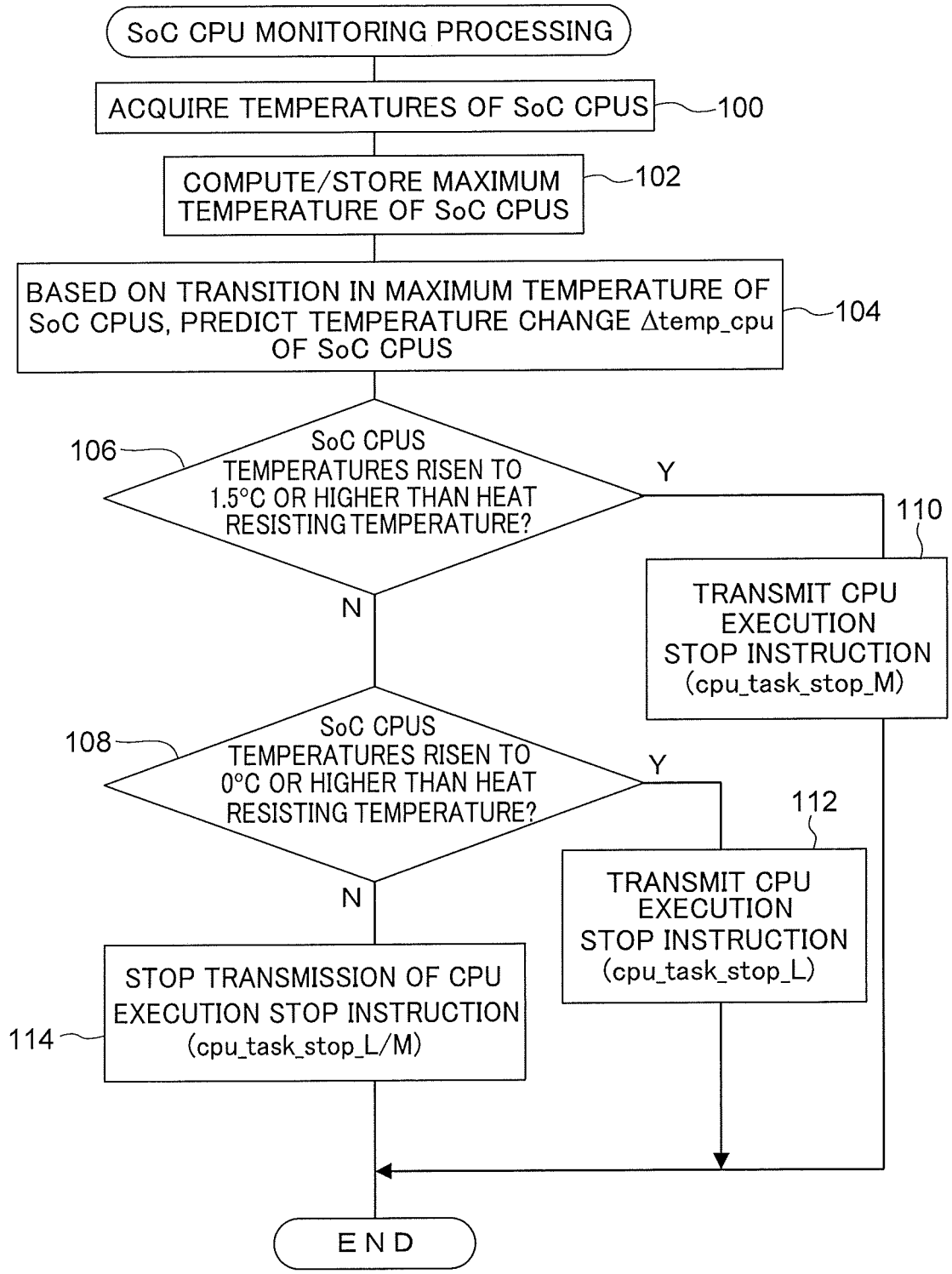
FIG. 4 is a flowchart exemplifying SoC CPU monitoring processing.

Next, SoC CPU monitoring processing, which is executed periodically at the monitoring MCU 68 during the time that the automatic driving software 48 is being executed at the SoC 36, is described first with reference to FIG. 4 as operation of the embodiment.

In step 100 of the SoC CPU monitoring processing, the monitoring MCU 68 acquires the respective detected values of the temperatures of the individual CPUs 38 of the SoC 36 from the plural temperature sensors 39 that are provided at the SoC 36. In step 102, the monitoring MCU 68 computes the maximum temperature of the CPUs 38 at the SoC 36 from the detected values of the temperatures of the individual CPUs 38 acquired in step 100, and stores the maximum temperature in the memory 72.

In subsequent step 104, on the basis of the transition in the maximum temperature of the CPUs 38 of the SoC 36 within a first predetermined time period (e.g., within the past 1000 msec) stored in the memory 72, the monitoring MCU 68 predicts temperature change $\Delta$temp_cpu of the CPUs 38 of the SoC 36 of after a second predetermined time period (e.g., after 100 msec). Note that the prediction of the temperature change $\Delta$temp_cpu can be carried out by applying a known technique such as regression analysis or the like for example.

In step 106, on the basis of the temperature change $\Delta$temp_cpu that has been predicted in step 104, the monitoring MCU 68 judges whether or not the temperatures of the CPUs 38 of the SoC 36 will, after the second predetermined time period, rise to greater than or equal to a temperature that is 1.5[° C.] higher than upper limit value temp_soc_max of the heat resisting temperature of the SoC 36 (refer also to following judgment condition formula (1)).

$$\text{temp\_current\_cpu} + \Delta\text{temp\_cpu} \geq \text{temp\_soc\_max} + 1.5[°\text{C.}] \quad (1)$$

Note that temp_current_cpu is the current maximum temperature of the CPUs 38 that has been computed in step 102. Further, "a temperature that is 1.5[° C.] higher than upper limit value temp_soc_max of the heat resisting temperature of the SoC 36" is an example of the second threshold value.

In a case in which above-described judgment condition formula (1) is not satisfied, the judgment in step 106 is negative, and the routine moves on to step 108. In step 108, on the basis of the temperature change Δtemp_cpu that has been predicted in step 104, the monitoring MCU 68 judges whether or not the temperatures of the CPUs 38 of the SoC 36 will, after the second predetermined time period, rise to greater than or equal to a temperature that is 0[° C.] higher than the upper limit value temp_soc_max of the heat resisting temperature of the SoC 36 (refer also to following judgment condition formula (2)).

$$\text{temp\_soc\_max} + 1.5[°\text{ C.}] > \text{temp\_current\_cpu} + \Delta\text{temp\_cpu} \geq \text{temp\_soc\_max} + 0[°\text{ C.}] \quad (2)$$

Note that "a temperature that is 0[° C.] higher than upper limit value temp_soc_max of the heat resisting temperature of the SoC 36" is an example of the first threshold value.

In a case in which above-described judgment condition formula (2) is not satisfied, the judgment in step 108 is negative, and the routine moves on to step 114. In step 114, the monitoring MCU 68 stops transmission of a CPU execution stop instruction (cpu_task_stop_L/M) to the SoC 36. In this case, the corresponding tasks of the respective software 52, 54, 56 that are included in the CPU-executed software 50 are respectively executed by any of the plural CPUs 38.

On the other hand, in a case in which the temperatures of the CPUs 38 of the SoC 36 rise for a reason such as, for example, the processing load of the SoC 36 has increased or the like, due to aforementioned judgment condition formula (2) being satisfied, the judgment in step 108 is affirmative, and the routine moves on to step 112. In step 112, the monitoring MCU 68 transmits, to the SoC 36, a CPU execution stop instruction (cpu_task_stop_L) that instructs stoppage of execution of tasks corresponding to the software 56 that have low degrees of priority.

Due thereto, through the software execution control processing that is described later, a rise in the temperatures of the CPUs 38 of the SoC 36 is suppressed due to stoppage of execution of tasks, which correspond to the software 56 that have low degrees of priority, by the CPUs 38 of the SoC 36. Further, although processing of the additional functions of the automatic driving processing is stopped, processing of the basic functions and the auxiliary functions of the automatic driving processing continues.

Further, in a case in which the temperatures of the CPUs 38 of the SoC 36 further rise for a reason such as, for example, the processing load of the SoC 36 has further increased or the like, due to aforementioned judgment condition formula (1) being satisfied, the judgment in step 106 is affirmative, and the routine moves on to step 110. In step 110, the monitoring MCU 68 transmits, to the SoC 36, a CPU execution stop instruction (cpu_task_stop_M) that instructs stoppage of execution of tasks corresponding to the software 54, 56 whose degrees of priority are medium or are lower than that (refer also to "stoppage instruction" shown in FIG. 7).

Due thereto, through the software execution control processing that is described later, a rise in the temperatures of the CPUs 38 of the SoC 36 is suppressed due to stoppage of execution of tasks that correspond to the software 56 that have low degrees of priority and tasks that correspond to the software 54 that have medium degrees of priority, by the CPUs 38 of the SoC 36. Further, although processing of the auxiliary functions and additional functions of the automatic driving processing is stopped, processing of the basic functions of the automatic driving processing continues.

Figure 8:
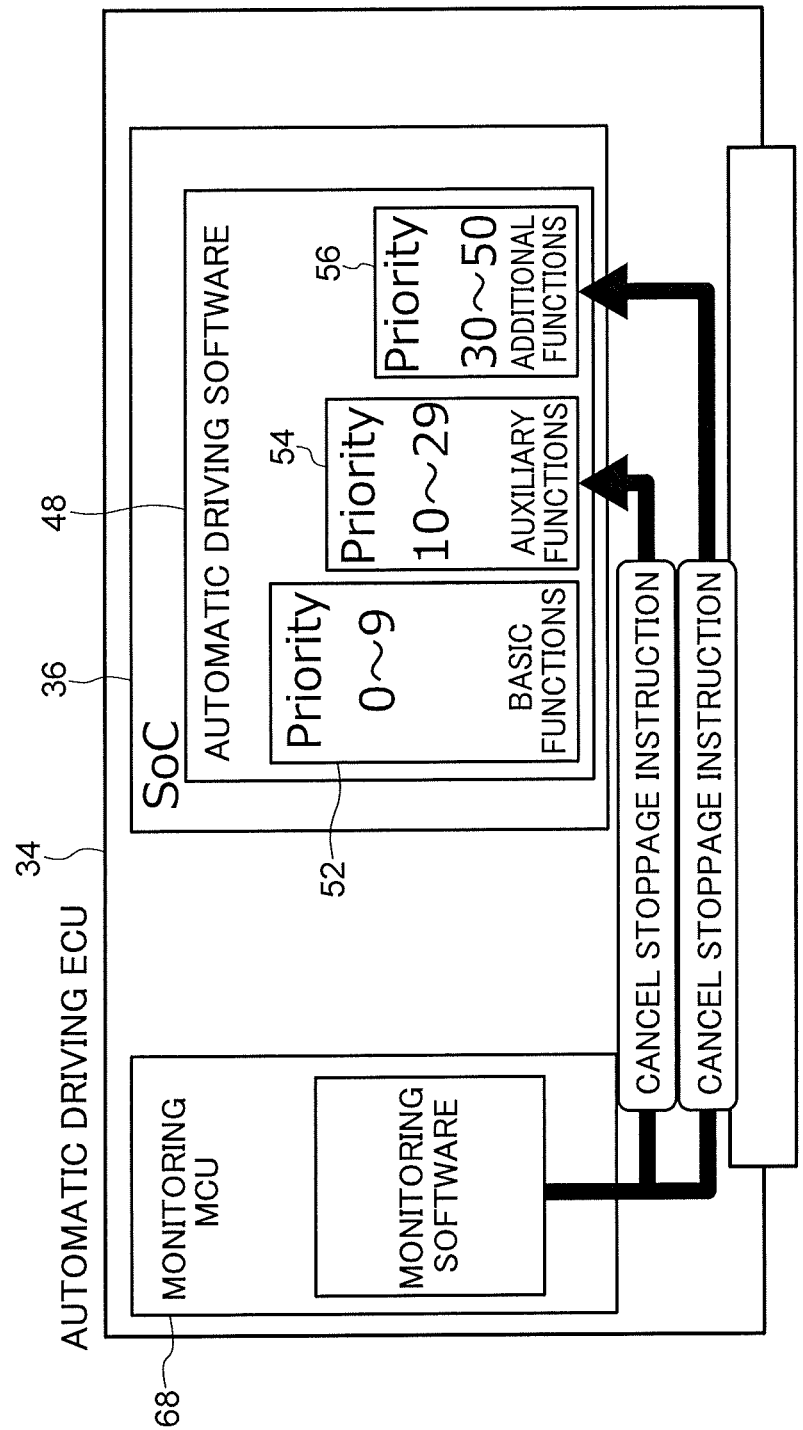
FIG. 8 is an image drawing exemplifying a case of restarting execution of tasks of medium and low degrees of priority of the SoC CPUs.

Note that, after the temperatures of the CPUs 38 of the SoC 36 rise once, in a case in which the temperatures of the CPUs 38 of the SoC 36 fall due to execution of some of the tasks being stopped accompanying the transmitting of the CPU execution stop instruction (cpu_task_stop_L/M), the judgments of steps 106, 108 are respectively affirmative, and, due thereto, the routine moves on to step 114. In this case, due to transmission of the CPU execution stop instruction (cpu_task_stop_L/M) being stopped (refer also to "cancel stoppage instruction" in FIG. 8), the execution of tasks whose execution had been stopped is restarted, and the SoC 36 returns to a state in which all of the functions of the automatic driving processing are provided.

Figure 5:
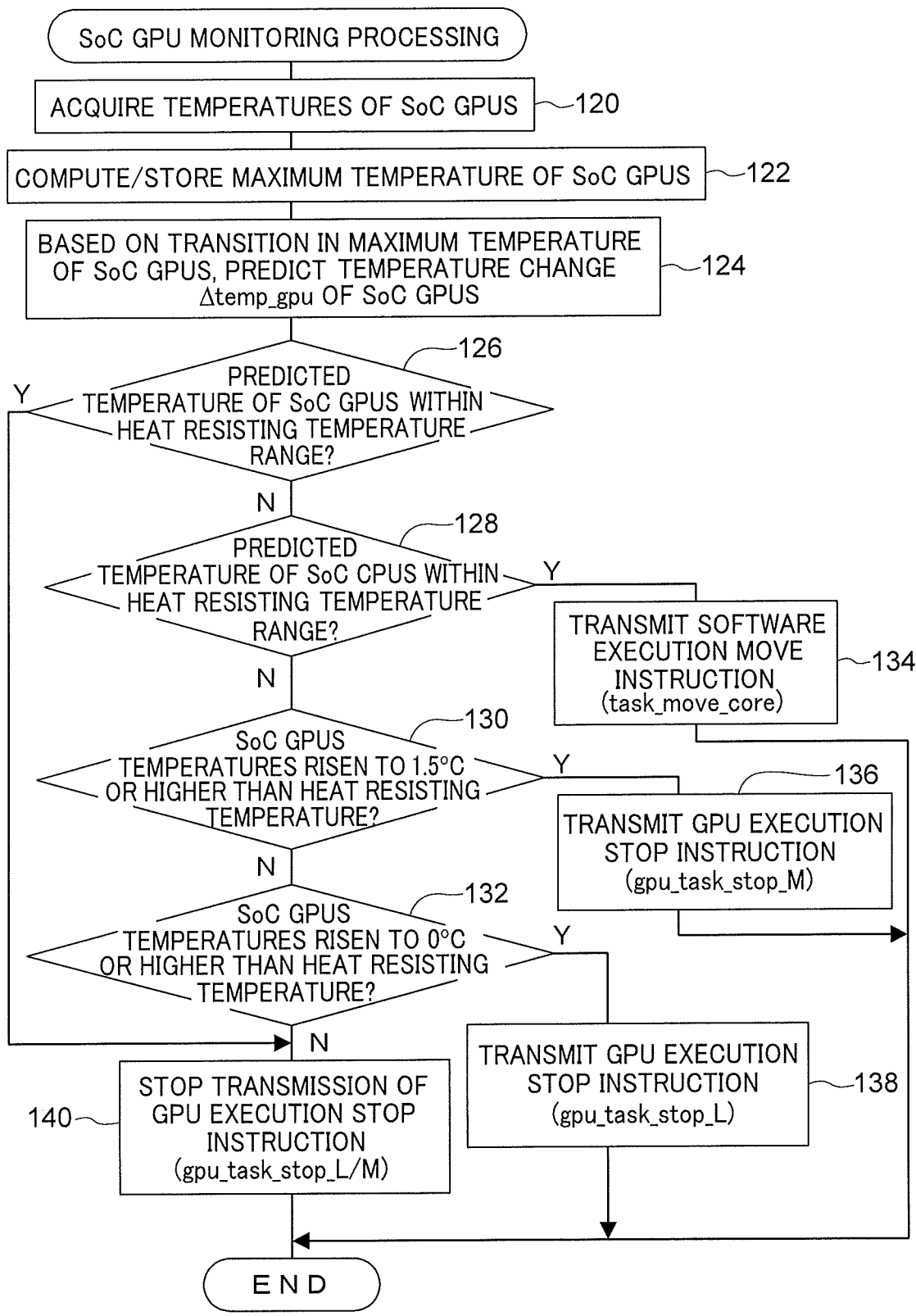
FIG. 5 is a flowchart exemplifying SoC GPU monitoring processing.

The SoC GPU monitoring processing, which is executed periodically by the monitoring MCU 68 while the automatic driving software 48 is being executed at the SoC 36, is described next with reference to FIG. 5.

In step 120 of the SoC GPU monitoring processing, the monitoring MCU 68 acquires the respective detected values of the temperatures of the individual GPUs 40 of the SoC 36 from the plural temperature sensors 42 that are provided at the SoC 36. In step 122, the monitoring MCU 68 computes the maximum temperature of the GPUs 40 at the SoC 36 from the detected values of the temperatures of the individual GPUs 40 acquired in step 120, and stores the maximum temperature in the memory 72.

In subsequent step 124, on the basis of the transition in the maximum temperature of the GPUs 40 of the SoC 36 within a first predetermined time period (e.g., within the past 1000 msec) stored in the memory 72, the monitoring MCU 68 predicts temperature change Δtemp_gpu of the GPUs 40 of the SoC 36 of after a second predetermined time period (e.g., after 100 msec). Note that the prediction of the temperature change Δtemp_gpu as well can be carried out by applying a known technique such as regression analysis or the like for example.

In step 126, on the basis of the temperature change Δtemp_gpu that has been predicted in step 124, the monitoring MCU 68 judges whether or not the temperatures of the GPUs 40 of the SoC 36 after the second predetermined time period (temp_current_gpu+Δtemp_gpu) are less than or equal to the upper limit value temp_soc_max of the heat resisting temperature of the SoC 36. Note that temp_current_gpu is the current maximum temperature of the GPUs 40 that has been computed in step 122.

In a case in which the judgment in step 126 is affirmative, the routine moves on to step 140. In step 140, the monitoring MCU 68 stops transmission of a GPU execution stop instruction (gpu_task_stop_L/M) to the SoC 36. In this case, the corresponding tasks of the respective software 60, 62, 64 that are included in the GPU-executed software 58 are respectively executed by any of the plural GPUs 40.

Further, if the judgment in step 126 is negative, the routine moves on to step 128. In step 128, the monitoring MCU 68 acquires the temperature change Δtemp_cpu of the CPUs 38 and the current maximum temperature temp_current_cpu of the CPUs 38 that have been acquired in the previously-described SoC CPU monitoring processing (FIG. 4), and judges whether or not the temperatures of the CPUs 38 of the SoC 36 after the second predetermined time period (temp_current_cpu+Δtemp_cpu) are less than or equal to the upper limit value temp_soc_max of the heat resisting temperature of the SoC 36.

In a case in which the judgment in step 128 is affirmative, the routine moves on to step 134. In this case, the temperatures of the GPUs 40 of the SoC 36 have become high, but, on the other hand, there is leeway in terms of temperature at the CPUs 38 of the SoC 36. Therefore, in step 134, the monitoring MCU 68 transmits, to the SoC 36, a software execution move instruction (task_move_core) that causes the tasks that have been being executed at the GPUs 40 to be executed at the CPUs 38. Due thereto, through the software execution control processing that is described later, a rise in the temperatures of the GPUs 40 of the SoC 36 is suppressed due to switching that is such that the tasks, which have been being executed at the GPUs 40 of the SoC 36, are executed at the CPUs 38 of the SoC 36.

Further, if the judgment in step 128 is negative, the routine moves on to step 130. In step 130, on the basis of the temperature change Δtemp_gpu predicted in step 124, the monitoring MCU 68 judges whether or not the temperatures of the GPUs 40 of the SoC 36 will, after the second predetermined time period, rise to greater than or equal to a temperature that is 1.5[° C.] higher than the upper limit value temp_soc_max of the heat resisting temperature of the SoC 36 (refer also to following judgment condition formula (3)).

$$\text{temp\_current\_gpu} + \Delta\text{temp\_gpu} \geq \text{temp\_soc\_max} + 1.5[° \text{C.}] \quad (3)$$

In a case in which the above judgment condition formula (3) is not satisfied, the judgment in step 130 is negative, and the routine moves on to step 132. In step 132, on the basis of the temperature change Δtemp_gpu predicted in step 124, the monitoring MCU 68 judges whether or not the temperatures of the GPUs 40 of the SoC 36 will, after the second predetermined time period, rise to greater than or equal to a temperature that is 0[° C.] higher than the upper limit value temp_soc_max of the heat resisting temperature of the SoC 36 (refer also to following judgment condition formula (4)).

$$\text{temp\_soc\_max} + 1.5[° \text{C.}] > \text{temp\_current\_gpu} + \Delta\text{temp\_gpu} \geq \text{temp\_soc\_max} + 0[° \text{C.}] \quad (4)$$

In a case in which the above judgment condition formula (4) is not satisfied, the judgment in step 132 is negative, and the routine moves on to step 140. In step 140, as described above, the monitoring MCU 68 stops transmission of a GPU execution stop instruction (gpu_task_stop_L/M) to the SoC 36.

On the other hand, in a case in which the temperatures of the GPUs 40 of the SoC 36 rise for a reason such as, for example, the processing load of the SoC 36 has increased or the like, due to aforementioned judgment condition formula (4) being satisfied, the judgment in step 132 is affirmative, and the routine moves on to step 138. In step 138, the monitoring MCU 68 transmits, to the SoC 36, a GPU execution stop instruction (gpu_task_stop_L) that instructs stoppage of execution of tasks corresponding to the software 64 that have low degrees of priority.

Due thereto, through the software execution control processing that is described later, a rise in the temperatures of the GPUs 40 of the SoC 36 is suppressed due to stoppage of execution of tasks, which corresponds to the software 64 that have low degrees of priority, by the GPUs 40 of the SoC 36. Further, because execution of tasks corresponding to the software 60, 62 that have higher degrees of priority is continued, effects on the automatic driving processing of the GPUs 40 stopping execution of some of the tasks can be reduced.

Further, in a case in which the temperatures of the GPUs 40 of the SoC 36 further rise for a reason such as, for example, the processing load of the SoC 36 has further increased or the like, due to aforementioned judgment condition formula (3) being satisfied, the judgment in step 130 is affirmative, and the routine moves on to step 136. In step 136, the monitoring MCU 68 transmits, to the SoC 36, a GPU execution stop instruction (gpu_task_stop_M) that instructs stoppage of execution of tasks corresponding to the software 62, 64 whose degrees of priority are medium or are lower than that.

Due thereto, through the software execution control processing that is described later, a rise in the temperatures of the GPUs 40 of the SoC 36 is suppressed due to stoppage of execution of tasks that correspond to the software 64 that have low degrees of priority and tasks that correspond to the software 62 that have medium degrees of priority, by the GPUs 40 of the SoC 36. Further, because execution of tasks corresponding to the software 60 that have higher degrees of priority is continued, effects on the automatic driving processing of the GPUs 40 stopping execution of some of the tasks can be reduced.

Note that, after the temperatures of the GPUs 40 of the SoC 36 rise once, due to execution of some of the tasks being stopped accompanying the transmitting of the GPU execution stop instruction (gpu_task_stop_L/M), in a case in which the temperatures of the GPUs 40 of the SoC 36 fall, the judgment of step 126 is affirmative, and, due thereto, the routine moves on to step 140. In this case, due to transmission of the GPU execution stop instruction (gpu_task_stop_L/M) being stopped, the execution of tasks whose execution had been stopped is restarted.

Figure 6:
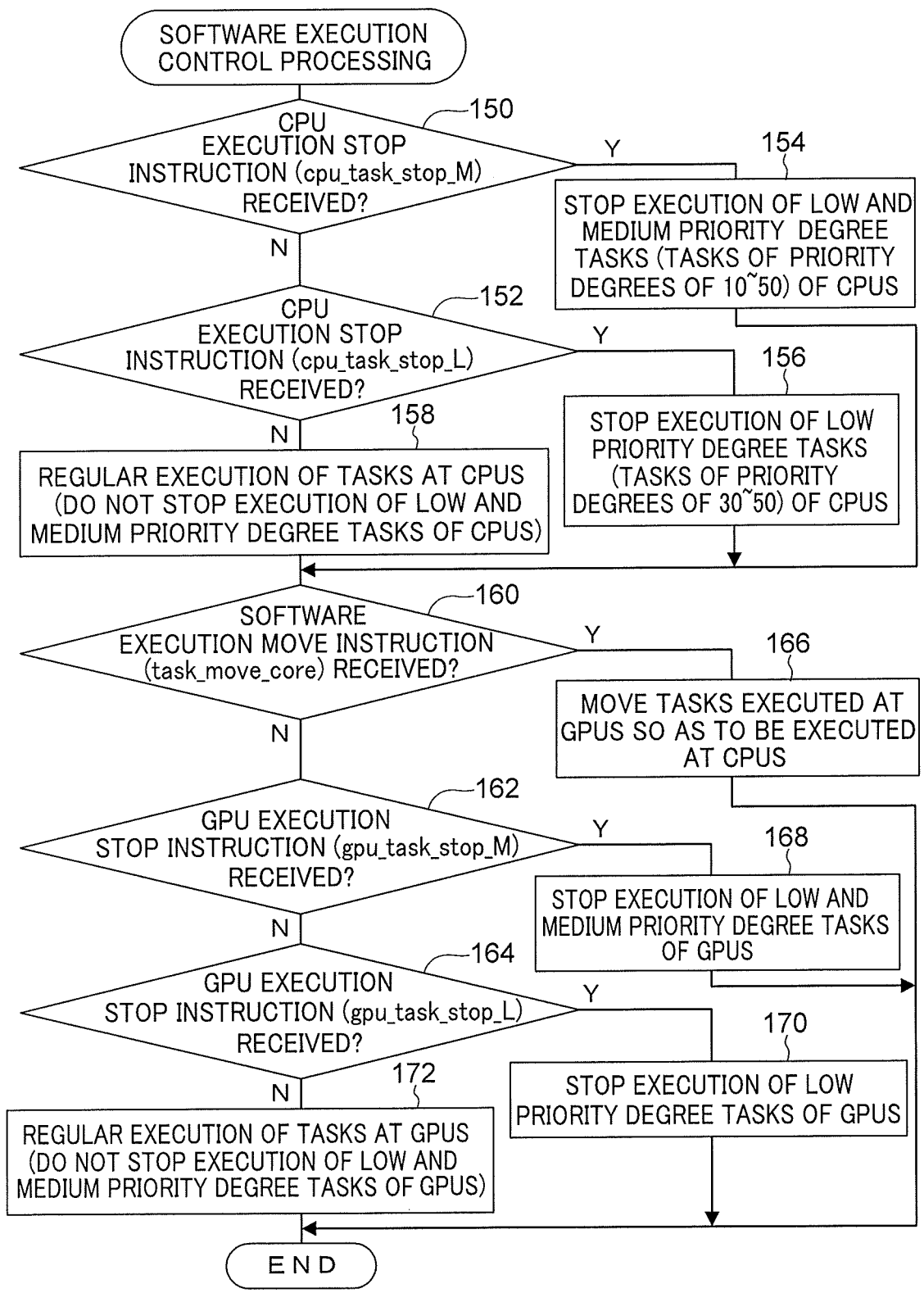
FIG. 6 is a flowchart exemplifying software execution control processing.

The software execution control processing, which is executed periodically at the SoC 36 while the automatic driving software 48 is being executed at the SoC 36, is described next with reference to FIG. 6.

In step 150 of the software execution control processing, the CPU 38, which executes the basic software 66, of the SoC 36 judges whether or not CPU execution stop instruction (cpu_task_stop_M) has been received from the monitoring MCU 68. If the judgment in step 150 is negative, the routine moves on to step 152. In step 152, the CPU 38, which executes the basic software 66, of the SoC 36 judges whether or not CPU execution stop instruction (cpu_task_stop_L) has been received from the monitoring MCU 68.

If the judgment in step 152 is negative, the routine moves on to step 158. In step 158, the CPU 38, which executes the basic software 66, of the SoC 36 sets the CPU-executed software list to a state (the initial state) in which all of the software 52, 54, 56 that are included in the CPU-executed software 50 are respectively registered.

Due thereto, the corresponding tasks of the respective the software 52, 54, 56 that are included in the CPU-executed software 50 are executed by any of the plural CPUs 38 of the SoC 36. When the processing of step 158 is carried out, the routine moves on to step 160.

Further, if the judgment in step 152 is affirmative, the routine moves on to step 156. In step 156, the CPU 38, which executes the basic software 66, of the SoC 36 sets the CPU-executed software list to a state in which, among the CPU-executed software 50, the software 52, 54 are registered and the software 56 are not registered.

Due thereto, the tasks that have high degrees of priority and correspond to the software 52 and the tasks that have medium degrees of priority and correspond to the software 54 are respectively executed by any of the plural CPUs 38 of the SoC 36, and, on the other hand, execution by the CPU 38 of the tasks that correspond to the software 56 and whose degrees of priority are low (tasks whose degrees of priority are 30~50) is stopped. When the processing of step 156 is carried out, the routine moves on to step 160.

Further, if the judgment in step 150 is affirmative, the routine moves on to step 154. In step 154, the CPU 38, which executes the basic software 66, of the SoC 36 sets the CPU-executed software list to a state in which, of the CPU-executed software 50, the software 52 are registered and the software 54, 56 are not registered.

Figure 7:
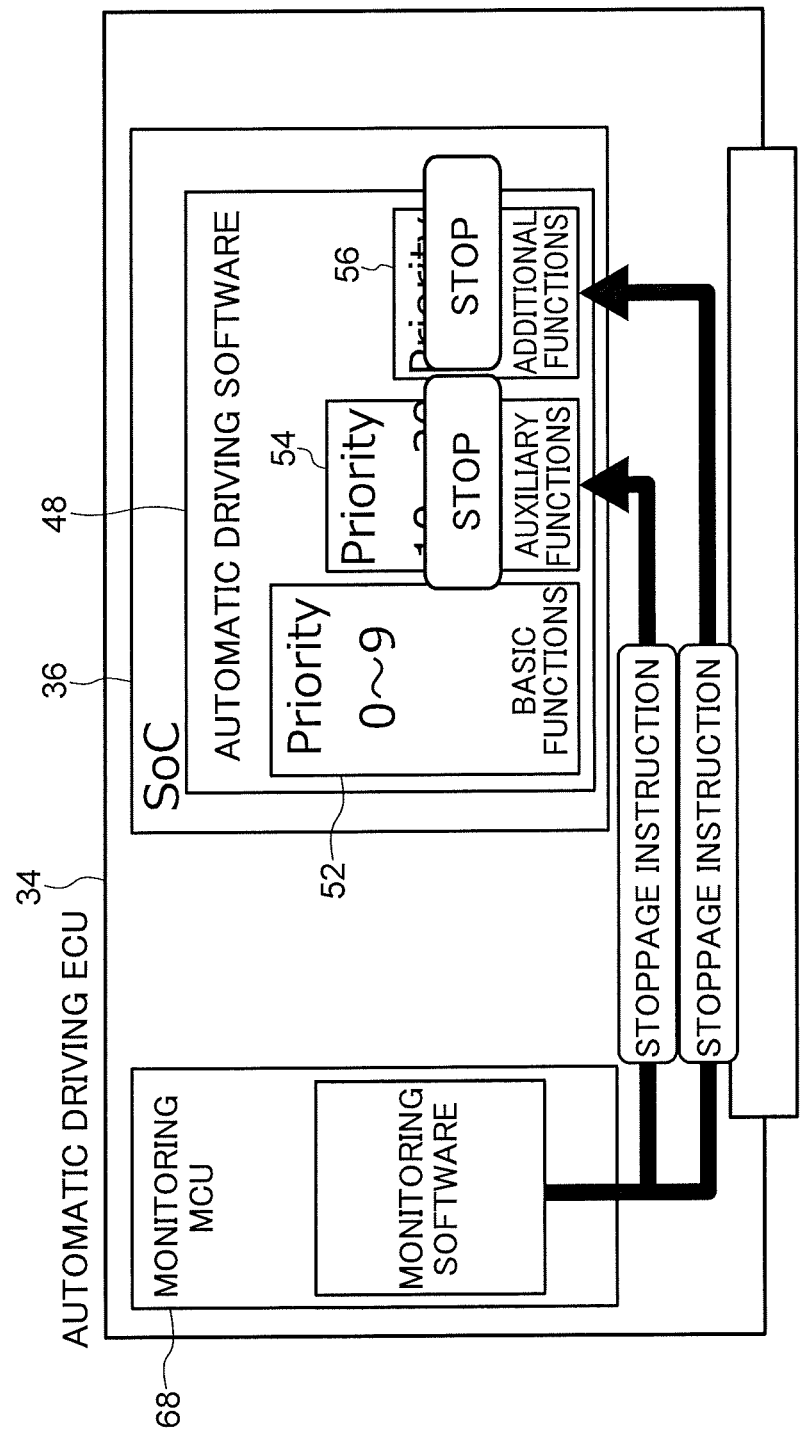
FIG. 7 is an image drawing exemplifying a case of stopping execution of tasks of medium and low degrees of priority of the SoC CPUs.

Due thereto, the tasks that have high degrees of priority and correspond to the software 52 are respectively executed by any of the plural CPUs 38, and, on the other hand, execution by the CPUs 38 of the tasks that have medium degrees of priority and correspond to the software 54, and the tasks that have low degrees of priority and that correspond to the software 56, (tasks whose degrees of priority are 10~50) is stopped (refer also to "stop" in FIG. 7). When the processing of step 156 is carried out, the routine moves on to step 160.

In step 160, the CPU 38, which executes the basic software 66, of the SoC 36 judges whether or not a software execution move instruction (task_move_core) has been received from the monitoring MCU 68. If the judgment in step 160 is negative, the routine moves on to step 162. In step 162, the CPU 38, which executes the basic software 66, of the SoC 36 judges whether or not a GPU execution stop instruction (gpu_task_stop_M) has been received from the monitoring MCU 68. If the judgment in step 162 is negative, the routine moves on to step 164. In step 164, the CPU 38, which executes the basic software 66, of the SoC 36 judges whether or not a GPU execution stop instruction (gpu_task_stop_L) has been received from the monitoring MCU 68.

If the judgment in step 164 is negative, the routine moves on to step 172. In step 172, the CPU 38, which executes the basic software 66, of the SoC 36 sets the GPU-executed software list to a state (the initial state) in which all of the software 60, 62, 64 that are included in the GPU-executed software 58 are respectively registered. Due thereto, the corresponding tasks of the respective software 60, 62, 64 that are included in the GPU-executed software 58 are respectively executed by any of the plural CPUs 38 of the SoC 36.

Further, if the judgment in step 164 is affirmative, the routine moves on to step 170. In step 170, the CPU 38, which executes the basic software 66, of the SoC 36 sets the GPU-executed software list to a state in which, of the GPU-executed software 58, the software 60, 62 are registered and the software 64 are not registered.

Due thereto, the tasks that have high degrees of priority and correspond to the software 60, and the tasks that have medium degrees of priority and correspond to the software 62, are respectively executed by any of the plural GPUs 40 of the SoC 36, and, on the other hand, execution by the GPUs 40 of the tasks whose degrees of priority are low and that correspond to the software 64 is stopped.

Further, if the judgment in step 162 is affirmative, the routine moves on to step 168. In step 168, the CPU 38, which executes the basic software 66, of the SoC 36 sets the CPU-executed software list to a state in which, of the GPU-executed software 58, the software 60 are registered and the software 62, 64 are not registered.

Due thereto, the tasks that have high degrees of priority and correspond to the software 60 are respectively executed by any of the plural GPUs 40 of the SoC 36, and, on the other hand, execution by the GPUs 40 of the tasks that have medium degrees of priority and correspond to the software 62, and the tasks that have low degrees of priority and correspond to the software 64, is stopped.

If the judgment in step 160 is affirmative, the routine moves on to step 166. In step 166, the CPU 38, which executes the basic software 66, of the SoC 36 moves tasks such that the tasks that are being executed at the GPUs 40 of the SoC 36 are executed at the CPUs 38 of the SoC 36 instead of the GPUs 40.

As described above, in the present embodiment, in accordance with temperature information of the SoC 36 at which the plural CPUs 38 and the plural GPUs 40 are mounted, the monitoring MCU 68 stops execution of tasks having low degrees of priority, among the plural tasks that are respective being executed by any of the plural CPUs 38 or the plural GPUs 40. Due thereto, even in a case in which the temperature of the SoC 36 is high, a further rise in temperature of the SoC 36 can be suppressed, and execution of tasks whose degrees of priority are high can be continued. Accordingly, even in a case in which the temperature of the SoC 36, at which the plural CPUs 38 and the plural GPUs 40 are mounted, is high, the stopping of functions that the SoC 36 realizes on the whole can be avoided.

Further, in the present embodiment, the predicted value (Δtemp_cpu or Δtemp_gpu) of the change in temperature of the SoC 36 is computed as the temperature information of the SoC 36. Due thereto, a rise in the temperature of the SoC 36 can be inferred in advance. Further, in a case in which it is predicted that the temperature of the SoC 36 will rise to greater than or equal to the first threshold value (a temperature that is 0[° C.] higher than upper limit value temp_soc_max of the heat resisting temperature of the SoC 36), the execution of tasks having low degrees of priority is stopped. Due thereto, the temperature of the SoC 36 rising to the first threshold value or higher can be suppressed, and a temperature state in which tasks having high degrees of priority can be executed can be maintained.

Further, in the present embodiment, in a case in which it is predicted that the temperature of the SoC 36 will fall to lower than the first threshold value (a temperature that is 0[° C.] higher than the upper limit value temp_soc_max of the heat resisting temperature of the SoC 36), the execution of tasks, which have low degrees of priority and whose execution has been stopped, is restarted. Due thereto, in a case in which the predicted temperature of the SoC 36 falls, the SoC 36 can be returned at an early stage to a normal operating state.

Further, in the present embodiment, in a case in which it is predicted that the temperature of the SoC 36 will become greater than or equal to the second threshold value (a temperature that is 1.5 [° C.] higher than the upper limit value temp_soc_max of the heat resisting temperature of the SoC 36) that is higher than the first threshold value, execution of multiple tasks is stopped in order from the tasks having low degrees of priority. Due thereto, the temperature of the SoC 36 rising to a temperature at which execution of tasks having high degrees of priority cannot be continued can be avoided.

Further, in the present embodiment, in a case in which it is predicted that the temperatures of the GPUs 40 will rise to greater than or equal to a threshold value (the upper limit value temp_soc_max of the heat resisting temperature of the SoC 36), and it is not predicted that the temperatures of the CPUs 38 will rise to greater than or equal to the threshold value, the tasks that have been being executed at the GPUs 40 are made to be executed at the CPUs 38. Due thereto, the tasks that have been being executed at the GPUs 40 can be executed continuingly at the CPUs 38.

In the present embodiment, the automatic driving ECU 34 that includes the SoC 36 is installed in a vehicle, and the plural tasks that are respectively executed by any of the plural CPUs 38 and the plural GPUs 40 are tasks in which processing that relates to automatic driving of the vehicle is carried out by any of these plural processors. Due thereto, reliability with respect to the functions that realize automatic driving can be improved.

Note that the above describes a form in which the degrees of priority of the software that are executed at the CPUs 38 or the GPUs 40 are set so as to be divided into three levels. However, the present invention is not limited to this, and the degrees of priority may be set so as to be divided into two levels, or four or more levels.

Further, although the above describes a form in which the temperature sensor 39, 42 detects the temperature per processor (CPU 38/GPU 40), the present invention is not limited to this and may be structured such that, for example, the temperatures of regions at which plural processors are disposed are detected by a number of temperature sensors that is smaller than the number of processors.

Note that, although an SoC is described as an example of the chip in the above description, the present invention is not limited to this. The chip may be, for example, a multi-core processor at which plural CPUs are mounted but GPUs are not mounted, or the like.

An object of the present invention is to provide an information processing device that, even in a case in which the temperature of a chip on which plural processors are mounted becomes high, can avoid stoppage of the functions realized by the chip as a whole.

A first aspect is an information processing device that includes: a memory; and a monitoring processor that is coupled to the memory, wherein the monitoring processor is configured to, in accordance with temperature information of a chip on which a plurality of monitored processors are mounted, stop execution of tasks designated as having low degrees of priority that are set in advance, among a plurality of tasks that are respectively executed at any of the plurality of monitored processors.

In the first aspect, execution of tasks of which degrees of priority, which have been set in advance, are low among the plural tasks that are being executed is stopped in accordance with temperature information of the chip on which the plural processors are mounted. Therefore, even in a case in which the temperature of the chip is high, the temperature of the chip rising further can be suppressed. Further, because execution of tasks of which degrees of priority are high can be continued, effects that the stoppage of execution of tasks has on the functions that the chip realizes on the whole can be suppressed. Accordingly, in accordance with the first aspect, even in a case in which the temperature of a chip on which plural processors are mounted is high, stoppage of functions that the chip realizes on the whole can be avoided.

A second aspect is the information processing device of the first aspect, wherein the monitoring processor is configured to compute a predicted value of a change in temperature of the chip as temperature information of the chip, and to, in a case in which it is predicted that a temperature of the chip will rise to greater than or equal to a first threshold value, stop execution of the tasks designated as having low degrees of priority.

In the second aspect, because the predicted value of the change in the temperature of the chip is computed, a rise in the temperature of the chip can be inferred in advance. Further, in a case in which it is predicted that the temperature of the chip will rise to greater than or equal to a first threshold value, execution of tasks having low degrees of priority is stopped. Therefore, the temperature of the chip rising to the first threshold value or higher can be suppressed, and the chip can be maintained in a temperature state in which at least tasks having high degrees of priority can be executed.

A third aspect is the information processing device of the second aspect, wherein the monitoring processor is configured to, in a case in which it is predicted that the temperature of the chip will fall to less than the first threshold value, restart execution of the tasks designated as having low degrees of priority and for which execution has been stopped.

In the third aspect, in a case in which it is predicted that the temperature of the chip will fall to less than the first threshold value, the execution of tasks, which have low degrees of priority and for which execution has been stopped, is restarted. Therefore, in a case in which the predicted temperature of the chip decreases, the chip can be returned at an early stage to the normal operating state in which all of the tasks, including the tasks having low degrees of priority, are executed.

A fourth aspect is the information processing device of the second or the third aspect, wherein the monitoring processor is configured to, in a case in which it is predicted that the temperature of the chip will become greater than or equal to a second threshold value that is higher than the first threshold value, stop execution of more tasks than in a case in which the temperature of the chip will become greater than or equal to the first threshold value, wherein the tasks are stopped in order starting from a lowest degree of priority.

In the fourth aspect, in a case in which it is predicted that the temperature of the chip will become greater than or equal to the second threshold value that is higher than the first threshold value, execution of multiple tasks is stopped in order from the tasks having low degrees of priority. Therefore, the temperature of the chip rising to a temperature at which execution of tasks having high degrees of priority cannot be continued can be avoided.

A fifth aspect is the information processing device of any of the first to the fourth aspect, wherein: CPUs and GPUs are included among the plurality of monitored processors, and the monitoring processor is configured to, in a case in which it is predicted that temperatures of the GPUs will rise to greater than or equal to a first threshold value and it is not predicted that temperatures of the CPUs will rise to greater than or equal to a second threshold value, cause tasks that have been executed at the GPUs to be executed at the CPUs instead of the GPUs.

In the fifth aspect, in a case in which it is predicted that the temperatures of the GPUs will rise to greater than or equal to a threshold value and it is not predicted that the temperatures of the CPUs will rise to greater than or equal to a threshold value, the tasks that have been being executed at the GPUs are made to be executed at the CPUs instead of the GPUs. Therefore, the tasks that have been being executed at the GPUs can be continuingly executed at the CPUs.

A sixth aspect is the information processing device of any of the first to the fifth aspect, wherein: the information processing device is installed in a vehicle, and the plurality of tasks are tasks that cause processings relating to automatic driving of the vehicle to be carried out by any of the plurality of monitored processors.

In the sixth aspect, processings relating to automatic driving of the vehicle are carried out at any of the plural processors. Even in a case in which the temperature of the chip is high, stoppage of functions that are realized by the chip on the whole, and, in this case, functions that realize automatic driving, can be avoided. Therefore, the reliability with respect to functions that realize automatic driving can be improved.

A seventh aspect is the information processing device of the sixth aspect, wherein tasks, which are designated as having high degrees of priority that are set in advance, among the plurality of tasks are tasks that cause any of the plurality of monitored processors to carry out processings that carry out throttle operation, brake operation and steering wheel operation of the vehicle.

The processings that carry out throttle operation, brake operation and steering wheel operation of the vehicle are basic processings in automatic driving of a vehicle. In the seventh aspect, even in a case in which the temperature of the chip is high, the basic processings of automatic driving of the vehicle can be continuingly executed.

A eighth aspect is the information processing of any of the first to the seventh aspect, wherein the chip is an SoC.

An SoC (System-on-a-Chip) is a chip in which, in addition to plural processors, other peripheral circuits also are integrated. Therefore, in accordance with the eighth aspect, making the information processing device even more compact can be realized.

The other aspects can be the information processing methods, that respectively correspond to the respective information processing devices of the first to the eighth aspect.

In accordance with the present disclosure, even in a case in which the temperature of a chip, on which plural processors are mounted, is high, stoppage of functions that are realized by the chip on the whole can be avoided.

What is claimed is:

1. An information processing device comprising:
   a memory; and
   a monitoring processor that is coupled to the memory, wherein:
      the monitoring processor is configured to, in accordance with temperature information of each of a plurality of monitored processors, stop execution of tasks designated as having low degrees of priority that are set in advance, among a plurality of tasks that are respectively executed at any of the plurality of monitored processors, the plurality of monitored processors being different from the monitoring processor,
      CPUs and GPUs are included among the plurality of monitored processors, and
      the monitoring processor is configured to, in a case in which it is predicted that temperatures of the GPUs will rise to greater than or equal to a first threshold value and it is not predicted that temperatures of the CPUs will rise to greater than or equal to a second threshold value, cause tasks that have been executed at the GPUs to be executed at the CPUs instead of the GPUs.

2. The information processing device of claim 1, wherein the monitoring processor is configured to compute a predicted value of a change in temperature of each of the plurality of monitored processors as temperature information of each of the plurality of monitored processors, and to, in a case in which it is predicted that a temperature of each of the plurality of monitored processors will rise to greater than or equal to a first threshold value, stop execution of the tasks designated as having low degrees of priority.

3. The information processing device of claim 2, wherein the monitoring processor is configured to, in a case in which it is predicted that the temperature of each of the plurality of monitored processors will fall to less than the first threshold value, restart execution of the tasks designated as having low degrees of priority and for which execution has been stopped.

4. The information processing device of claim 2, wherein the monitoring processor is configured to, in a case in which it is predicted that the temperature of each of the plurality of monitored processors will become greater than or equal to a second threshold value that is higher than the first threshold value, stop execution of more tasks than in a case in which the temperature of each of the plurality of monitored processors will become greater than or equal to the first threshold value, wherein the tasks are stopped in order starting from a lowest degree of priority.

5. The information processing device of claim 1, wherein:
   the information processing device is installed in a vehicle, and
   the plurality of tasks are tasks that cause processings relating to automatic driving of the vehicle to be carried out by any of the plurality of monitored processors.

6. The information processing device of claim 5, wherein tasks, which are designated as having high degrees of priority that are set in advance, among the plurality of tasks are tasks that cause any of the plurality of monitored processors to carry out processings that carry out throttle operation, brake operation and steering wheel operation of the vehicle.

7. The information processing device of claim 1, wherein each of the plurality of monitored processors is an SoC.

8. An information processing method in an on-vehicle information processing device that includes a monitoring processor and a plurality of monitored processors, the method comprising:
   executing, via any of the plurality of monitored processors, any of a plurality of tasks that relate to automatic driving of a vehicle in which the on-vehicle information processing device is installed; and
   in accordance with temperature information of each of the plurality of monitored processors, stopping, via the monitoring processor, execution of tasks designated as having low degrees of priority that are set in advance, among the plurality of tasks that are respectively executed at any of the plurality of monitored processors, the plurality of monitored processors being different from the monitoring processor,
   wherein:
   CPUs and GPUs are included among the plurality of monitored processors, and
   the method further comprises, in a case in which it is predicted that temperatures of the GPUs will rise to greater than or equal to a first threshold value and it is not predicted that temperatures of the CPUs will rise to greater than or equal to a second threshold value, causing, via the monitoring processor, tasks that have been executed at the GPUs to be executed at the CPUs instead of the GPUs.

9. The information processing method of claim 8, further comprising computing, via the monitoring processor, a predicted value of a change in temperature of each of the plurality of monitored processors as temperature information of each of the plurality of monitored processors is computed by the monitoring processor, and, in a case in which it is predicted that a temperature of each of the plurality of monitored processors will rise to greater than or equal to a first threshold value, stopping execution of the tasks designated as having low degrees of priority.

10. The information processing method of claim 9, further comprising, in a case in which it is predicted that the temperature of each of the plurality of monitored processors will fall to less than the first threshold value, restarting, via the monitoring processor, execution of the tasks designated as having low degrees of priority and for which execution has been stopped.

11. The information processing method of claim 9, further comprising, in a case in which it is predicted that the temperature of each of the plurality of monitored processors will become greater than or equal to a second threshold value that is higher than the first threshold value, stopping, via the monitoring processor, execution of more tasks than in a case in which the temperature of each of the plurality of monitored processors will become greater than or equal to the first threshold value, wherein the tasks are stopped in order starting from from a lowest degree of priority.

* * * * *